(12) United States Patent
Chen et al.

(10) Patent No.: US 9,279,089 B2
(45) Date of Patent: Mar. 8, 2016

(54) DEVICE FOR CONVERTING A FUEL

(75) Inventors: Li Chen, Nantes (FR); Anthony Kerihuel, Nort sur Erdre (FR); Luc Gerun, Thiancourt (FR)

(73) Assignee: S3D, Nantes (FR)

( * ) Notice: Subject to any disclaimer, the term of this patent is extended or adjusted under 35 U.S.C. 154(b) by 422 days.

(21) Appl. No.: 13/876,015

(22) PCT Filed: Oct. 5, 2011

(86) PCT No.: PCT/FR2011/052318
§ 371 (c)(1),
(2), (4) Date: Mar. 26, 2013

(87) PCT Pub. No.: WO2012/049400
PCT Pub. Date: Apr. 19, 2012

(65) Prior Publication Data
US 2013/0185999 A1    Jul. 25, 2013

(30) Foreign Application Priority Data

Oct. 12, 2010    (FR) ..................................... 10 58252

(51) Int. Cl.
*C10J 3/84* (2006.01)
*C10J 3/74* (2006.01)
(Continued)

(52) U.S. Cl.
CPC . *C10J 3/84* (2013.01); *C10B 51/00* (2013.01); *C10B 53/02* (2013.01); *C10J 3/64* (2013.01);
(Continued)

(58) Field of Classification Search
CPC .................. C10J 3/00; C10J 3/74; C10J 3/84; C10J 2300/1606; F23G 5/24; F23G 7/10; F23G 2201/301; F23G 2201/303; F23G 2201/304
See application file for complete search history.

(56) References Cited

U.S. PATENT DOCUMENTS 4,213,848 A * 7/1980 Saxton .......................... 208/127
4,740,216 A   4/1988 Allard
(Continued)

FOREIGN PATENT DOCUMENTS

JP    2013-519761    5/2013
WO    02/40618 A1    5/2002
(Continued)

OTHER PUBLICATIONS

International Search Report, dated Feb. 21, 2012, from corresponding PCT application.

*Primary Examiner* — Matthew Merkling
(74) *Attorney, Agent, or Firm* — Sofer & Haroun, LLP

(57) ABSTRACT

A device for converting a fuel including solid components, known as a solid fuel, into a gaseous fuel, includes a pyrolysis zone (2) for pyrolyzing solid fuel, having pyrolysis elements that are capable of decomposing the solid fuel into a pyrolysis gas and into a solid pyrolysis residue, known as coke, and a combustion zone (3), which is distinct from the pyrolysis zone (2), for burning the pyrolysis gas and having combustion elements (31, 32, 33). The device also includes elements for circulating pyrolysis gas from the pyrolysis zone (2) to the combustion zone (3), which is surrounded by the pyrolysis zone (2).

18 Claims, 3 Drawing Sheets

(51) Int. Cl.
*C10J 3/64* (2006.01)
*C10B 51/00* (2006.01)
*F23G 5/24* (2006.01)
*F23G 7/10* (2006.01)
*C10B 53/02* (2006.01)
*F23G 5/027* (2006.01)

(52) U.S. Cl.
CPC *C10J 3/74* (2013.01); *F23G 5/027* (2013.01); *F23G 5/24* (2013.01); *F23G 7/10* (2013.01); C10J 2300/0909 (2013.01); C10J 2300/1606 (2013.01); C10J 2300/1807 (2013.01); F23G 2201/301 (2013.01); F23G 2201/303 (2013.01); F23G 2201/304 (2013.01); F23G 2205/16 (2013.01); F23G 2209/262 (2013.01); F23G 2209/28 (2013.01); Y02E 50/14 (2013.01)

(56) References Cited

U.S. PATENT DOCUMENTS

| | | |
|---|---|---|
| 6,350,288 B1 | 2/2002 | Hirayama et al. |
| 7,537,623 B2 * | 5/2009 | Etievant et al. ............ 48/198.1 |
| 9,115,321 B2 | 8/2015 | Schwarz et al. |
| 2009/0020052 A1 * | 1/2009 | Becchetti et al. ............ 110/346 |
| 2009/0282738 A1 | 11/2009 | Tharpe, Jr. |
| 2013/0097928 A1 | 4/2013 | Schwarz et al. |

FOREIGN PATENT DOCUMENTS

| | | |
|---|---|---|
| WO | 2007/124570 A1 | 11/2007 |
| WO | 2008/059109 A1 | 5/2008 |
| WO | 2008/145814 A1 | 12/2008 |

* cited by examiner

DEVICE FOR CONVERTING A FUEL

BACKGROUND OF THE INVENTION

1. Field of the Invention

The present invention relates in general to the gasification of fuels comprising solid components.

More particularly, the invention relates to a device for converting a fuel comprising solid components, known as a solid fuel, into a gaseous fuel, said device comprising:
- a pyrolysis zone for the pyrolyzing solid fuel, comprising pyrolysis means that are capable of decomposing said solid fuel into a pyrolysis gas and into a solid pyrolysis residue, known as coke; and
2. Description of the Related Art
- a combustion zone, which is distinct from the pyrolysis zone, for burning said pyrolysis gas and comprising combustion means.

Said gaseous fuel obtained with the aid of such a device is an energetic gas, generally termed syngas, which can be used to drive appropriate equipment such as engines, turbines, or even fuel cells. However, syngas often contains tars, and equipment suitable for being supplied with syngas has a low threshold of tolerance to tar. Beyond a corresponding tolerance threshold, condensation of tar in such equipment causes rapid deterioration of said equipment.

Specific gas treatment units exist that can be used to reduce the quantity of tar remaining in the syngas. However, such treatment units are bulky and expensive.

Devices known as staged gasification devices are known in the art; they comprise a pyrolysis zone and a distinct combustion zone. The gasifier from the Danish manufacturer TK Energi AS is an example. A device of that type can be used to reduce the tar content in the syngas obtained because the pyrolysis and combustion steps are partially separated out.

However, in such a known prior art device, a portion of the solid fuel is burned in order to provide the heat necessary for pyrolysis. Direct combustion of a solid of that type results in a loss of the energy efficiency of the device, as well as in the emission of polluting gases, for example dioxins.

Further, said pyrolysis and combustion zones are arranged for positioning end-to-end, and so the coke obtained from pyrolysis of the fuel passes through the combustion zone in order to form a reduction bed in the reduction zone, which means that the device becomes very bulky and the risk of polluting emissions is increased. Finally, the arrangement of the pyrolysis and combustion zones in such devices causes large energy losses in the combustion zone, which is not beneficial to the pyrolysis zone.

US2009/282738 discloses a device for converting a solid fuel into a gaseous fuel, which device comprises a pyrolysis zone and a combustion zone provided with combustion means.

However, in the device of document US2009/282738, the solid fuel is burned in the combustion zone and the combustion gases then circulate in the pyrolysis zone.

Thus, the device of that document US2009/282738 generates the same problem as that proposed by the Danish manufacturer TK Energi AS, which burns solid fuel to add energy. Such combustion of solid fuel generates polluting emissions and leads to a loss of energy efficiency.

Further, the solution in that document US2009/282738 is not aimed at obtaining an energetic gas, but rather a pyrolysis oil. It is then necessary to burn solid fuel in the combustion zone throughout the operation of the device in order to provide the additional heat required to carry out the pyrolysis reaction.

Document WO02/40618A1 describes a device comprising a central pyrolysis zone surrounded by a combustion zone. Such a configuration can be used to transmit part of the heat obtained from combustion to the pyrolysis zone, but large losses of heat have been observed from the combustion zone to the outside of the device. Thus, heat recovery by the pyrolysis zone is not optimized.

The aim of the present invention is to propose a device for converting a solid fuel into a gaseous fuel that can be used to limit heat losses from the combustion zone out of the device and to improve heat recovery by the pyrolysis zone.

SUMMARY OF THE INVENTION

Another aim of the present invention is to propose a device for converting a solid fuel into a gaseous fuel, known as syngas, wherein the quantity of impurities, in particular tars, is reduced.

Another aim of the present invention is to propose a device for converting a solid fuel into a gaseous fuel, known as syngas, by means of which the emission of pollutants, such as dioxins and metals, is reduced.

To this end, the invention provides a device for converting a fuel comprising solid components, known as a solid fuel, into a gaseous fuel, said device comprising:
- a pyrolysis zone for pyrolyzing solid fuel, comprising pyrolysis means that are capable of decomposing said solid fuel into a pyrolysis gas and into a solid pyrolysis residue, known as coke;
- a combustion zone, which is distinct from the pyrolysis zone, for burning said pyrolysis gas and comprising combustion means; and
- gas circulation means for circulating gas in order to circulate said pyrolysis gas from said pyrolysis zone to the combustion zone;

the device being characterized in that said combustion zone is surrounded by said pyrolysis zone.

The design of the device of the invention, wherein the pyrolysis zone surrounds the combustion zone, means that losses of heat from the combustion zone to the outside of the device are reduced, while heat recovery by the pyrolysis zone is promoted, because of the transfer of heat from the combustion zone to the pyrolysis zone that encircles the combustion zone.

Since the combustion zone is separate from the pyrolysis zone, the solid fuel is not in contact with the oxidizer such as air that injected into the combustion zone, which means that the emission of pollutants can be limited.

Because wood pyrolysis is carried out, preferably at a temperature of about 500° C., metals and chlorine remain in the coke obtained from the pyrolysis of wood, while the pyrolysis gas is free from polluting elements. Furthermore, the combustion of pyrolysis gas in the absence of solid fuel in the combustion zone means that a maximum quantity of tars can be cracked.

The communicating passage between the pyrolysis zone and the combustion zone is formed in the upper portion of the pyrolysis zone and the combustion zone. Thus, the pyrolysis gas can pass from the pyrolysis zone into the combustion zone, while the solids do not pass into the combustion zone and remain in said pyrolysis zone before passing, as is described in detail below, into the reduction zone when they become sufficiently small because of the pyrolysis.

Such a configuration for the combustion zone around the pyrolysis zone means that the overall size of the device can be reduced and advantage can be taken from the transfer of the heat obtained by combustion from the combustion zone to the pyrolysis zone by conduction through the wall or walls separating the two zones, as is described in detail below.

Furthermore, the zone of the device that is at a very high temperature is confined to the combustion zone, for example to the burner, thereby reducing the quantity of materials that withstand high temperatures that need to be used in the design of the device. This also helps to reduce heat losses and thus to maximize the total yield of the conversion process.

In accordance with an advantageous feature of the invention, said combustion zone is housed coaxially in said pyrolysis zone.

Said pyrolysis and combustion zones are defined between two coaxial cylindrical walls with circular sections such that the combustion zone forms a circular zone centered in said annular space that defines the pyrolysis zone.

In accordance with an advantageous feature of the invention, said device comprises a reduction zone that has a passage communicating with the pyrolysis zone to collect coke obtained from pyrolysis of the solid fuel, a station for receiving said coke, and a passage communicating with the combustion zone for gas entering said gas reduction zone obtained from the combustion of pyrolysis gas in order to enrich said gas obtained from the combustion of pyrolysis gas in at least hydrogen.

Advantageously, said gas-circulation means are also configured to provide for circulating the gas that is obtained from burning pyrolysis gas, from said combustion zone to the reduction zone.

By means of such a configuration of the device, the various gasification steps, namely pyrolysis, burning, and reduction, are physically separated, which means that each of these conversion steps can be optimized.

Preferably, said communicating passage comprises a ramp dropping from the pyrolysis zone to the reduction zone in order to collect coke in its receiving station under gravity.

Advantageously, the ramp forms the base of the pyrolysis zone and extends around the combustion zone to form a cone to guide coke towards the reduction zone. Since said pyrolysis zone is annular in shape and defined between an outer peripheral wall and an inner peripheral wall, said ramp co-operates with the inner peripheral wall to define an outlet for the solid residue obtained from pyrolysis of solid fuel, the outlet being of a height that is smaller than the distance separating said peripheral walls from each other.

In cross section, said annular-shaped pyrolysis zone has an inner circumference and an outer circumference that preferably are circular in shape; however, said inner circumference and outer circumference of the annular pyrolysis zone may have some other shape.

Advantageously, said device comprises fitter means for filtering gas obtained from reducing the coke and configured to filter said gas and re-inject the solid particles, such as dust or ash contained in said gas, into the reduction zone.

In accordance with an advantageous feature of the invention, said combustion means include an inlet for oxidizer, preferably air, and means for initiating the reaction between the oxidizer and the pyrolysis gas.

In an embodiment of the invention, said combustion zone and said pyrolysis zone include a common separating wall. Advantageously, at least part of said reduction zone is located below said combustion zone and/or below said pyrolysis zone.

In accordance with an advantageous feature of the invention, at least part of said reduction zone is located between said combustion zone and said pyrolysis zone, surrounding the combustion zone.

In other words, the reduction zone separates said combustion zone from said pyrolysis zone. In particular, the combustion zone is surrounded by the reduction zone that is itself surrounded by the pyrolysis zone such that the reduction zone is defined between a wall that defines the inner peripheral circumference of the pyrolysis zone and a peripheral wall that defines the combustion zone.

Preferably, said device comprises a zone for circulating the gas obtained from reducing the coke and configured to allow said gas to circulate around the pyrolysis zone in order to transmit at least some of its heat to the pyrolysis zone by conduction via a wall of said pyrolysis zone, preferably the outer peripheral wall.

Thus, the pyrolysis zone is heated both by the combustion zone and by the gas circulating in the circulation zone that surrounds the pyrolysis zone in order to enhance energy recovery via the pyrolysis zone.

Advantageously, said device comprises solid fuel drying means communicating with the inlet to the pyrolysis zone in order to dry the solid fuel prior to introducing it into said pyrolysis zone.

In accordance with an advantageous feature of the invention, said device comprises means for injecting steam into the reduction zone, preferably steam obtained from the drying means when they are present.

Preferably, since the device has an outer wall, at least a portion of the outer wall comprises thermal insulation means.

The invention also provides a method of converting a fuel comprising solid components, termed a solid fuel, into a gaseous fuel, with the aid of a device as described above, the method being characterized in that it comprises the following steps:

a) pyrolyzing solid fuel in the pyrolysis zone in order to decompose said solid fuel into a pyrolysis gas and into a solid pyrolysis residue known as coke;

b) burning, preferably partially burning, said pyrolysis gas in said combustion zone.

In accordance with an advantageous feature of the invention, in order to initiate said conversion, the combustion zone is pre-heated, preferably using a burner, and once said conversion has been initiated, pre-heating is reduced, and preferably halted.

In accordance with an advantageous feature of the invention, said process also comprises the following additional step:

c) reducing the gas obtained from partially burning pyrolysis gas, preferably in order to enrich said gas in hydrogen.

Advantageously, said reduction of the gas obtained from partially burning pyrolysis gas is carried out by means of a reaction between said gas and the coke obtained from solid fuel pyrolysis.

Preferably, the gas obtained from reduction circulates around the pyrolysis zone in order to transmit at least a portion of its heat to the pyrolysis zone.

Advantageously, said solid fuel is fed, preferably after drying, into the pyrolysis zone and is absent from the combustion zone.

BRIEF DESCRIPTION OF THE DRAWING FIGURES

The invention can be better understood from the following description of embodiments, made with reference to the accompanying drawings in which.

DETAILED DESCRIPTION OF THE INVENTION

Figure 1:
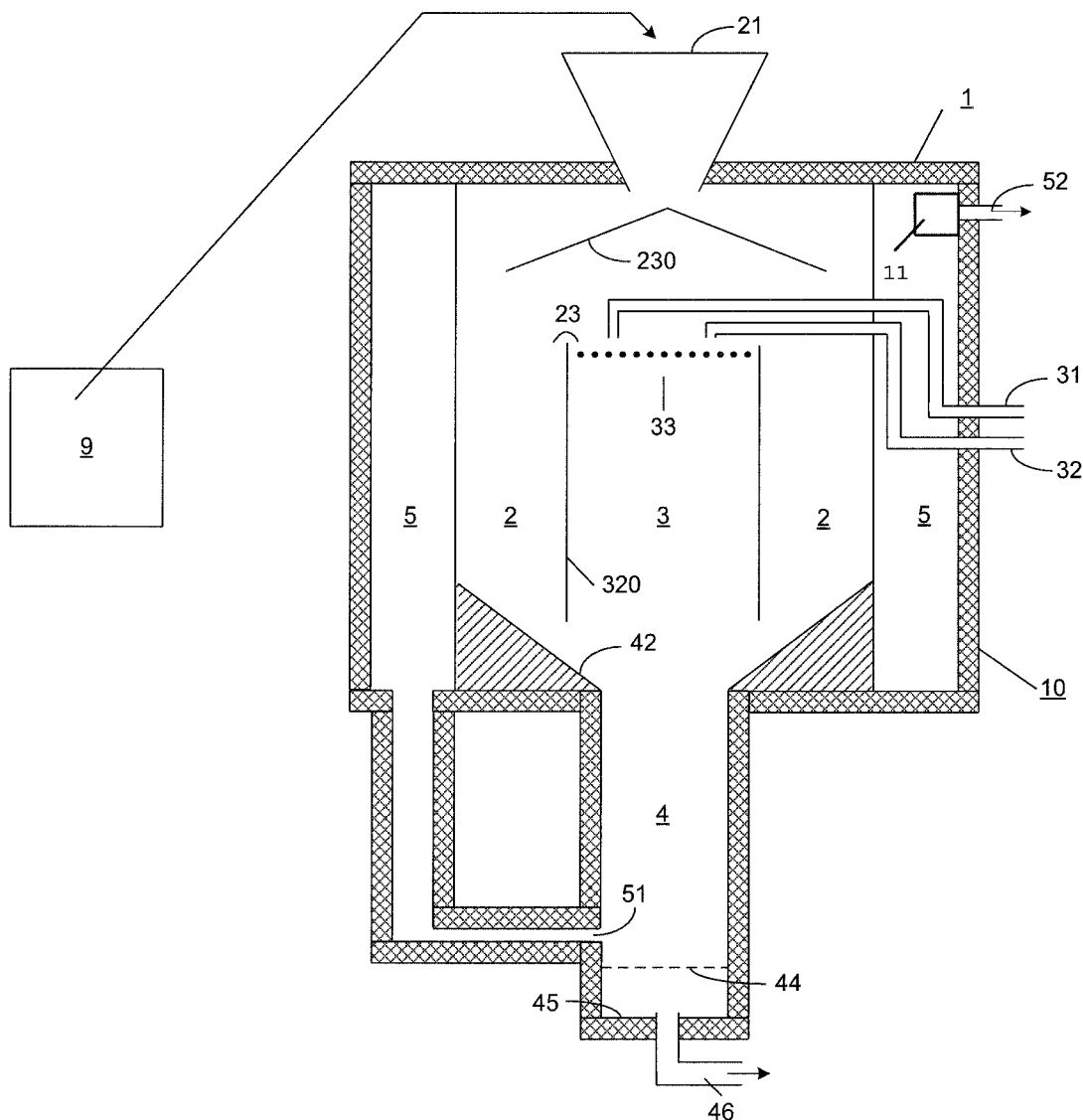
FIG. 1 is a view of a conversion device of the invention, in accordance with a first embodiment.

Referring to the figures and as noted above, the invention provides a device for converting a fuel comprising solid components, known as a solid fuel, into a gaseous fuel, known as syngas. Such a device is also known as a gasifier.

Gasification is a technique for the thermochemical conversion of solid fuel into a fuel gas, known as syngas, primarily comprising $H_2$ and CO.

It should be noted that the term "solid" as used encompasses solids per se, for example pieces of wood, but also granules, or fine elements such as sawdust.

Various types of solid organic materials may be used to form the solid fuel to be transformed into a gaseous fuel. In the example detailed below, the solid fuel used is wood.

The device comprises a solid fuel pyrolysis zone 2 comprising pyrolysis means that can be used to decompose said solid fuel into a pyrolysis gas and into a solid pyrolysis residue known as coke.

The device also comprises a combustion zone 3 for burning said pyrolysis gas, which combustion zone is distinct from the pyrolysis zone 2 and comprises combustion means 31, 32, 33 that can be used to carry out partial combustion of pyrolysis gas in order to oxidize the tars and the other hydrocarbons contained in said pyrolysis gas.

The device has a path 23 for passing pyrolysis gas to the combustion zone 3. Said pyrolysis means are formed by the wall or walls that define the pyrolysis zone, which walls can be used to transmit heat into the pyrolysis zone without any specific addition of oxygen. As is described in detail below, this heat source principally derives either directly or indirectly from the heat released by the combustion zone.

Characteristically for the invention, said combustion zone 3 is surrounded by said pyrolysis zone 2. Said pyrolysis zone 2 extends around the combustion zone 3 over at least 180°. Preferably, said pyrolysis zone 2 extends around the combustion zone 3 over 360° in order to completely surround it like a belt.

Said pyrolysis zone comprises an inlet 21 for the supply of solid fuel, configured so that the solid fuel is fed into the pyrolysis zone via an upturned V-shaped dome 230, part of which extends over the pyrolysis zone 2 and part of which extends over the combustion zone 3 without entering the combustion zone.

Figure 2:
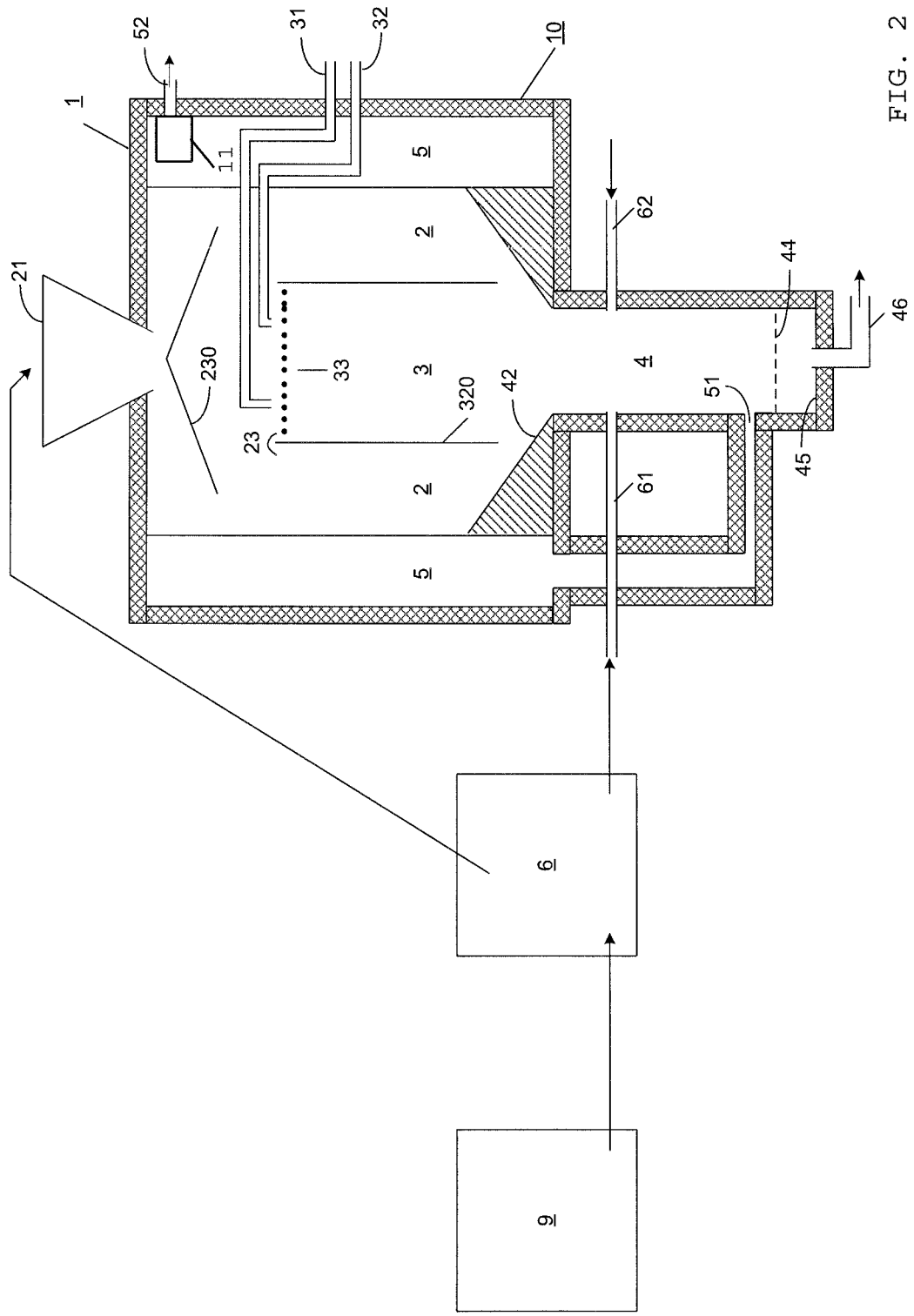
FIG. 2 is a view of a conversion device of the invention, in accordance with a second embodiment.

In the example shown in FIGS. 1 and 2, said path 23 for passing pyrolysis gas to the combustion zone 3 is formed by the opening in the upper portion of the combustion zone 3 that communicates with the upper portion of the pyrolysis zone 2, and guide means formed by the upturned V-shaped dome 230 in order to guide the pyrolysis gas from the upper portion of the pyrolysis zone 2 to the combustion zone 3.

In particular, said device is provided with gas-circulation means for circulating gas 11 in order to circulate the pyrolysis gas from said pyrolysis zone 2 to the combustion zone 3. More generally, said gas-circulation means are configured to allow the gas present in the device to circulate from the pyrolysis zone 2 to the outlet 52 from said device.

In the example shown in FIG. 3, in which the pyrolysis zone is separated from the combustion zone by the reduction zone 4 as is described in detail below, one or more ducts 23 are provided in order to pass pyrolysis gas from the pyrolysis zone 2 to the combustion zone 3.

Said combustion means 31, 32, 33 of the combustion zone 3 comprise an inlet 31 for oxidizer, preferably air, and means 32, 33 for initiating the reaction between the oxidizer and the pyrolysis gas. Said initiating means are formed by a burner 33 and an inlet 32 for fuel, preferably propane, which is different from the pyrolysis gas, in order to form a high temperature air flame along with the oxidizer fed via the inlet 31, preferably at a temperature of at least 1000° C., in order to provide the heat necessary for pyrolysis and to initiate partial burning of the pyrolysis gas. After initiating partial burning of the pyrolysis gas, i.e. during normal operation of the gasifier, the flow rate of the incoming fuel 32 can be reduced or even halted.

As described in detail below and shown in FIGS. 2 and 3, the device may be equipped with means 6 for drying the solid fuel in order to obtain a dry solid fuel and water in the vapor state.

Pyrolysis enables solid fuel to be converted, in the absence of oxygen in the combustion zone, into a gas known as pyrolysis gas and into a solid residue known as coke. The pyrolysis gas includes tars, which are a mixture of hydrocarbons with high condensation temperatures, higher than that of benzene. As described in detail below, the tars are produced during pyrolysis and then oxidized and cracked thermally during the partial burning stage in the combustion zone, and finally they are catalytically cracked in the reduction zone with the coke.

The combustion zone 3 can be used to partially oxidize the pyrolysis gas (tars and other hydrocarbons) in order to produce molecules of $CO_2$ and $H_2O$. The heat released by the partial oxidation of the pyrolysis gas in the combustion zone 3 is transferred directly or indirectly to the solid fuel present in the pyrolysis zone 2 and to the coke present in the reduction zone 4.

The pyrolysis gas combustion means thus form at least a portion of said pyrolysis means. In other words, the heat obtained from partially burning pyrolysis gas is recovered at least in part by the pyrolysis zone 2 such that the pyrolysis reaction is self-maintaining once partial burning of the pyrolysis gas has been initiated.

The solid fuel is not in direct contact with the oxidizer injected into the combustion zone 3, thereby reducing the emission of any pollutants such as dioxins or metals.

In particular, each of the combustion and pyrolysis zones is cylindrical, with a circular section for the combustion zone 3 and an annular section for the pyrolysis zone 2. Said combustion zone 3 is mounted coaxially in said pyrolysis zone 2.

In the example shown in FIGS. 1 and 2, partial oxidation of pyrolysis gas releases heat that is transferred, via the peripheral wall 320 separating the pyrolysis zone 2 from the combustion zone 3, to the solid fuel present in the pyrolysis zone 2. In particular, in the example shown in FIGS. 1 and 2, the peripheral wall 320 separates the two zones, the pyrolysis zone 2 and the combustion zone 3, by defining the inner circumference of the annular pyrolysis zone 2 and the outer circumference of the circular combustion zone 3.

Said device also includes a reduction zone 4 that has a passage 42 communicating with the pyrolysis zone 2 to collect coke obtained from pyrolysis of the solid fuel, and a receiving station 44 for said coke in order to form a reduction bed. Said reduction zone also includes a passage 43 communicating with the combustion zone 3 to allow combustion products, in particular CO, $CO_2$, $CH_4$, $H_2O$ and $H_2$, obtained from partially burning the pyrolysis gases, to enter into said reduction zone 4 in order to enrich the gas obtained from partially burning the pyrolysis gas, at least in $H_2$.

To this end, said means 11 for circulating gas are also configured in order to ensure that the gas obtained from the combustion of pyrolysis gas is circulated from said combustion zone to the reduction zone.

Said circulation means 11 may be formed by a turbine disposed at or in the vicinity of the outlet 52 from the device in order to force the circulation of gas from the pyrolysis zone 2 to the outlet 52 of the device, passing via the combustion zone 3, and the other treatment zones such as the reduction zone 4; preferably, as described in detail below, the gas-circulation zone 5 extends around the reduction zone 4.

The syngas thus obtained also contains CO. The communicating passage 42 is configured so that it does not pass through the combustion zone 3 in order to avoid reacting coke with the high temperature oxidizer of the combustion zone 3.

Thus, pyrolysis with the device of the invention enables tars to be released from the solid fuel, which tars then pass through the very hot combustion zone, then through the bed of coke. This results in the tars cracking, and so not only is tar eliminated per se, but also the composition of the final gas is improved and the quantity of gas produced is increased.

In the example shown in FIGS. 1 and 2, the reduction bed formed by the coke is preferably very deep, not only so as to react with the gas obtained from the combustion zone in order to promote the production of $H_2$ and CO, but also to act as a filter in order, as far as possible, to eliminate tars and particles remaining in said gas in order to obtain a clean gas.

Figure 3:
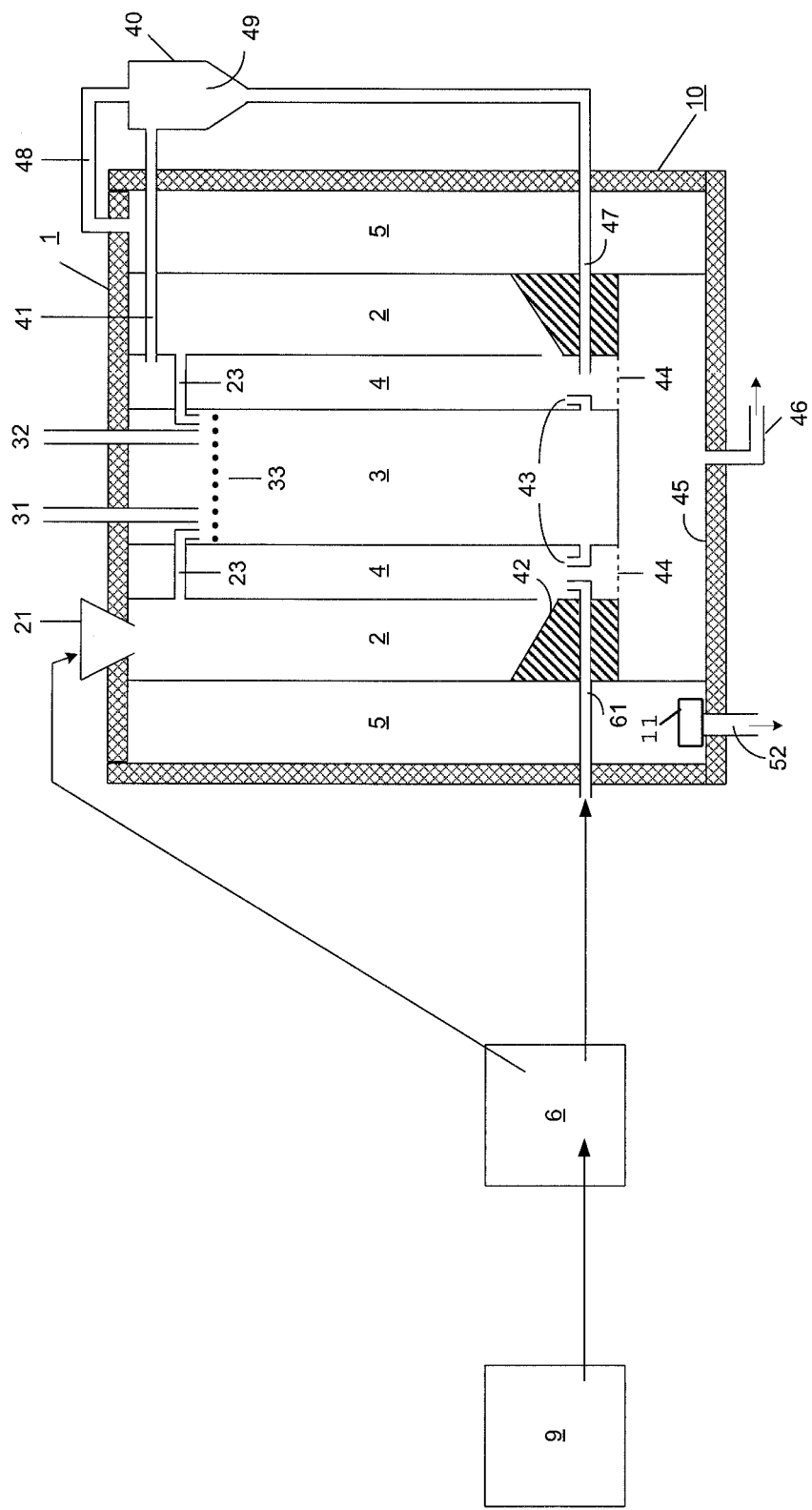
FIG. 3 is a view of a conversion device of the invention, in accordance with a third embodiment.

In the example shown in FIG. 3, the heat released by the combustion zone 3 is transmitted to the pyrolysis zone 2 via the facing peripheral walls of the reduction zone 4, which are common both to the combustion zone 3 and the pyrolysis zone 2.

Relative to the center of the combustion zone, the communicating passage 43 is located remote from the communicating passage 23 between the pyrolysis zone 2 and the combustion zone 3 in order to recover the gas obtained from partially burning the pyrolysis gas, i.e. after oxidation of the tars and the other hydrocarbons.

In the example shown in FIGS. 1 and 2, said reduction zone 4 is located below the level of said combustion zone 3 and of said pyrolysis zone 2. In addition, said reduction zone 4 is located vertically below said combustion zone 3 so as to allow the $CO_2$ and $H_2O$ products obtained from partially burning the pyrolysis gas to react with the bed of coke located in said station 44.

The receiving station 44 is preferably defined by a screen that holds the coke and allows ash obtained from reducing the coke to pass through and be recovered in an ash pan 45 located below the screen then evacuated via a duct 46.

Advantageously, the device is provided with means for reducing the pressure in the reduction zone 4 in order to ensure that gas obtained from partially burning pyrolysis gas circulates through the bed of coke present in the reduction zone 4.

Said passage 42 providing for communication of the pyrolysis zone 2 with the reduction zone 4 comprises a ramp dropping from the pyrolysis zone 2 to the reduction zone 4 in order to allow coke to collect under gravity in its receiving station 44. Said ramp 42 forms the bottom wall of the pyrolysis zone.

In cooperation with the inner peripheral wall of the pyrolysis zone, said ramp 42 defines an outlet for evacuating solid fuel residue after pyrolysis, having a size that is smaller than the distance separating the inner and outer peripheral walls of the pyrolysis zone 2. Thus, the solid fuel is evacuated from the pyrolysis zone by the ramp 42 towards the reduction zone 4 only after said solid fuel has been pyrolyzed, i.e. in the form of a solid residue of said fuel, with dimensions smaller than the dimensions of the as yet non-pyrolyzed solid fuel.

The ramp 42 extends about the axis of the pyrolysis zone 2 (which is aligned with the axis of the combustion zone 3) and also extends from the pyrolysis zone 2 to a zone located between the combustion zone 3 and the reduction zone 4 at right angles to the combustion zone 3, to form a flow cross section from the combustion zone 3 to the reduction zone 4 that is smaller in size than the dimensions of the section of the combustion zone 3.

The ramp 42 thus forms a flow restriction that increases the turbulence in the gas flows between the combustion zone 3 and the reduction zone 4 and promotes local oxidizer/pyrolysis gas mixing in the combustion zone 3. Furthermore, such a flow restriction may be used to improve local oxidizer/pyrolysis gas mixing on a macroscopic scale so as to limit the risk of relatively cold zones being present, over or through which the tars could pass without being cracked.

Said device also comprises a zone 5 for circulating gas obtained from reducing coke and configured to allow said gas to circulate around the pyrolysis zone 2 in order to transmit at least some of its heat to the pyrolysis zone 2 by conduction via the outer peripheral wall of said pyrolysis zone 2.

Said gas-circulation zone 5 is defined between the outer peripheral wall of the pyrolysis zone 2 and another peripheral wall, for example the outer peripheral wall of the device, which other wall surrounds said outer peripheral wall of the pyrolysis zone 2 at a distance therefrom.

Said circulation zone 5 includes a passage 51 communicating with the reduction zone 4 and a gas outlet 52 allowing gas to be recovered in order to drive appropriate equipment.

In the example shown in FIG. 3, said device comprises filter means 40 for filtering the gas obtained from coke reduction, and for re-injecting the solid particles contained in said gas into the reduction zone 4.

Said recirculation means 40 comprise an inlet 41 for gas opening into said reduction zone 4, a cyclone 49, an outlet 47 for re-injecting solid particles, such as dust or ash, into said reduction zone 4, and an outlet 48 for filtered gas communicating with the circulation zone 5 that extends around the pyrolysis zone 2.

Advantageously, the organic matter used as a solid fuel in the device of the invention has a moisture content of less than 50% (based on the dry content). The following fuels in particular may be mentioned:
- wood and uncontaminated derivatives thereof, such as sawdust, logs, or bark;
- poultry litter;
- wood containing additives;
- green waste;
- an organic fraction of household refuse;
- a plastics fraction of household refuse;
- plastics;
- tires.

As shown in FIGS. 2 and 3, the device of the invention may comprise means 6 for drying the solid fuel communicating with the inlet 21 of the pyrolysis zone 2, in order to dry the solid fuel prior to introducing it into said pyrolysis zone 2.

As shown in FIGS. 2 and 3, said device may be provided with means 61 for injecting steam into the reduction zone 4, preferably steam obtained from the drying means 6. Other gases may also be injected via a duct 62 into the reduction zone 4.

The device has an outer wall 10, so at least a portion of the outer wall of the device includes thermal insulation means. In particular, said outer wall of the device may be covered with a layer of thermal insulation.

The device as described above can be used to carry out a method of converting a solid fuel into gas as follows. This method is described below for a conversion device corresponding to the device shown in FIG. 1.

The gasifier is pre-heated with the aid of a burner 33 by supplying an oxidizer 31, air in this example, and a fuel 32, preferably propane 32 or, for example, syngas or another fuel gas. The gasifier may also be pre-heated by a flow of hot gas obtained from the exhaust gas or any other heat source.

Once the temperature of the pyrolysis zone of the gasifier is above the startup temperature, for example 500° C., the solid fuel stored in the storage zone 9 is fed into the pyrolysis zone 2. The wood is decomposed to produce a pyrolysis gas and a carbonaceous residue forming the coke.

The pyrolysis gas then passes into a combustion zone 3 and is partially burned with the injected air 31. The flow rate of the injected propane 32 is gradually reduced as the pyrolysis gas production increases until finally, continuous supply is stopped. In other words, the propane functions to ignite and pre-heat.

The coke obtained from pyrolysis slides along the ramp 42 under gravity and falls over the screen 44 to form a reduction bed.

The gas obtained from partially burning pyrolysis gas in the combustion zone 3 passes into the reduction zone 4 to react with the coke in order to enrich the gas that is produced in $H_2$ and CO.

Said device may be provided with a double wall, for example the zone 5 shown in FIGS. 1 to 3, heated by an external means, such as another heat source, combustion of a portion of the syngas, the exhaust gases from an engine, a turbine or a boiler, in order to reduce the startup time of the process and improve its operation.

Pre-heating the air injected at 31 into the combustion zone 3 may be carried out by recovering the heat from the gases produced and/or the heat released by the device and/or from any other source of heat.

The method described above may function with a gas 31 other than air in order to form the oxidizer injected into the combustion zone 3: pure oxygen, or air enriched in oxygen.

Preferably, the hot zone does not include any mechanisms, not even any mechanism for conveying the fuel, so technical complications are avoided.

By means of such a design of the device of the invention, solid fuel is never burned directly, nor is it brought into contact with the oxidizer injected into the combustion zone. As a result, the essential part of any pollutants (chlorine, metals) remains in the solid state in the ash or in the particle filter. Thus, emissions of dioxins and gaseous metals are greatly reduced compared with a conventional combustion method.

The device of the invention forms a gasifier that is simple to use and inexpensive. In fact, the conversion of solid fuel into gaseous fuel with such a device in accordance with the invention is simple to carry out, efficient, environmentally-friendly, and relatively inexpensive as regards extracting value from a solid fuel.

Furthermore, the solid fuel pyrolysis can be used to generate a pyrolysis gas that requires only a small quantity of oxygen to be injected for oxidation purposes, which means that the production of polluting compounds such as dioxins is limited. Such a device can also be used to further reduce polluting emissions.

As noted above, the syngas obtained by converting solid fuel may be used in a reliable and efficient manner in a variety of applications: boiler, internal combustion engine, turbine, fuel cell, or even small scale co-generation, etc.

The invention claimed is:

1. A device for converting a fuel comprising solid components, known as a solid fuel, into a gaseous fuel, said device comprising:
    a pyrolysis zone for pyrolyzing solid fuel, comprising pyrolysis means that are capable of decomposing said solid fuel into a pyrolysis gas and into a solid pyrolysis residue, known as coke;
    a combustion zone, which is distinct from the pyrolysis zone, for burning said pyrolysis gas and comprising combustion means, said combustion zone being surrounded by said pyrolysis zone;
    a path for passing pyrolysis gas to the combustion zone; and
    gas-circulation means for circulating gas in order to circulate said pyrolysis gas from said pyrolysis zone to the combustion zone;
    a reduction zone that has a passage communicating with the pyrolysis zone to collect coke obtained from pyrolysis of the solid fuel, a station for receiving said coke, and a passage communicating with the combustion zone for gas entering said gas reduction zone obtained from the combustion of pyrolysis gas in order to enrich said gas obtained from the combustion of pyrolysis gas in at least hydrogen, wherein
    said communicating passage comprises a ramp dropping from the pyrolysis zone to the reduction zone in order to collect coke in a receiving station under gravity,
    said pyrolysis zone is annular in shape and defined between an outer peripheral wall and an inner peripheral wall,
    said ramp co-operates with the inner peripheral wall to define an outlet for the solid residue obtained from pyrolysis of solid fuel, and
    the outlet being of a height that is smaller than a distance separating said peripheral walls from each other.

2. The device according to claim 1, wherein said combustion zone is housed coaxially in said pyrolysis zone.

3. The device according to claim 1, wherein said device further comprises a filter for filtering the gas obtained from reducing the coke and configured to filter said gas and re-inject the solid particles, such as dust or ash contained in said gas, into the reduction zone.

4. The device according to claim 1, wherein at least part of said reduction zone is located below said combustion zone and/or below said pyrolysis zone.

5. The device according to claim 1, wherein said device comprises a zone for circulating the gas obtained from reducing the coke and configured to allow said gas to circulate around the pyrolysis zone in order to transmit at least some of its heat to the pyrolysis zone by conduction via a wall of said pyrolysis zone, preferably the outer peripheral wall.

6. The device according to claim 1, wherein said device comprises means for injecting steam into the reduction zone.

7. The device according to claim 1, wherein at least part of said reduction zone is located between said combustion zone and said pyrolysis zone, surrounding the combustion zone.

8. The device according to claim 1, wherein said combustion zone and said pyrolysis zone include a common separating wall.

9. The device according to claim 1, wherein said combustion means comprise an inlet for oxidizer, and means for initiating the reaction between the oxidizer and the pyrolysis gas.

10. The device according to claim 1, wherein said device further comprises means for drying solid fuel communicating with the inlet to the pyrolysis zone in order to dry the solid fuel prior to introducing it into said pyrolysis zone.

11. The device according to claim 1, wherein, since the device has an outer wall, at least a portion of the outer wall of the device comprises thermal insulation means.

12. A method of converting a fuel comprising solid components, termed a solid fuel, into a gaseous fuel, with the aid of a device according to claim 1, the method comprising the following steps:
- a) pyrolyzing solid fuel in the pyrolysis zone in order to decompose said solid fuel into a pyrolysis gas and into a solid pyrolysis residue known as coke;
- b) burning, said pyrolysis gas in said combustion zone.

13. The method according to claim 12, wherein in order to initiate said conversion, the combustion zone is pre heated, and once said conversion has been initiated, pre-heating is reduced.

14. The method according to claim 12, wherein said process also comprises the following additional step:
- c) reducing the gas obtained from partially burning pyrolysis gas, preferably in order to enrich said gas in hydrogen.

15. The method according to claim 14, wherein said reduction of the gas obtained from partially burning pyrolysis gas is carried out by means of a reaction between said gas and the coke obtained from solid fuel pyrolysis.

16. The method according to claim 15, wherein the gas obtained from reduction circulates around the pyrolysis zone in order to transmit at least a portion of its heat to the pyrolysis zone.

17. The method according to claim 12, wherein said solid fuel is fed into the pyrolysis zone and is absent from the combustion zone.

18. The method according to claim 13, wherein said process also comprises the following additional step:
- c) reducing the gas obtained from partially burning pyrolysis gas, in order to enrich said gas in hydrogen.

* * * * *